(No Model.)
W. J. BELCHER.
BEVEL PROTRACTOR.
No. 568,597. Patented Sept. 29, 1896.
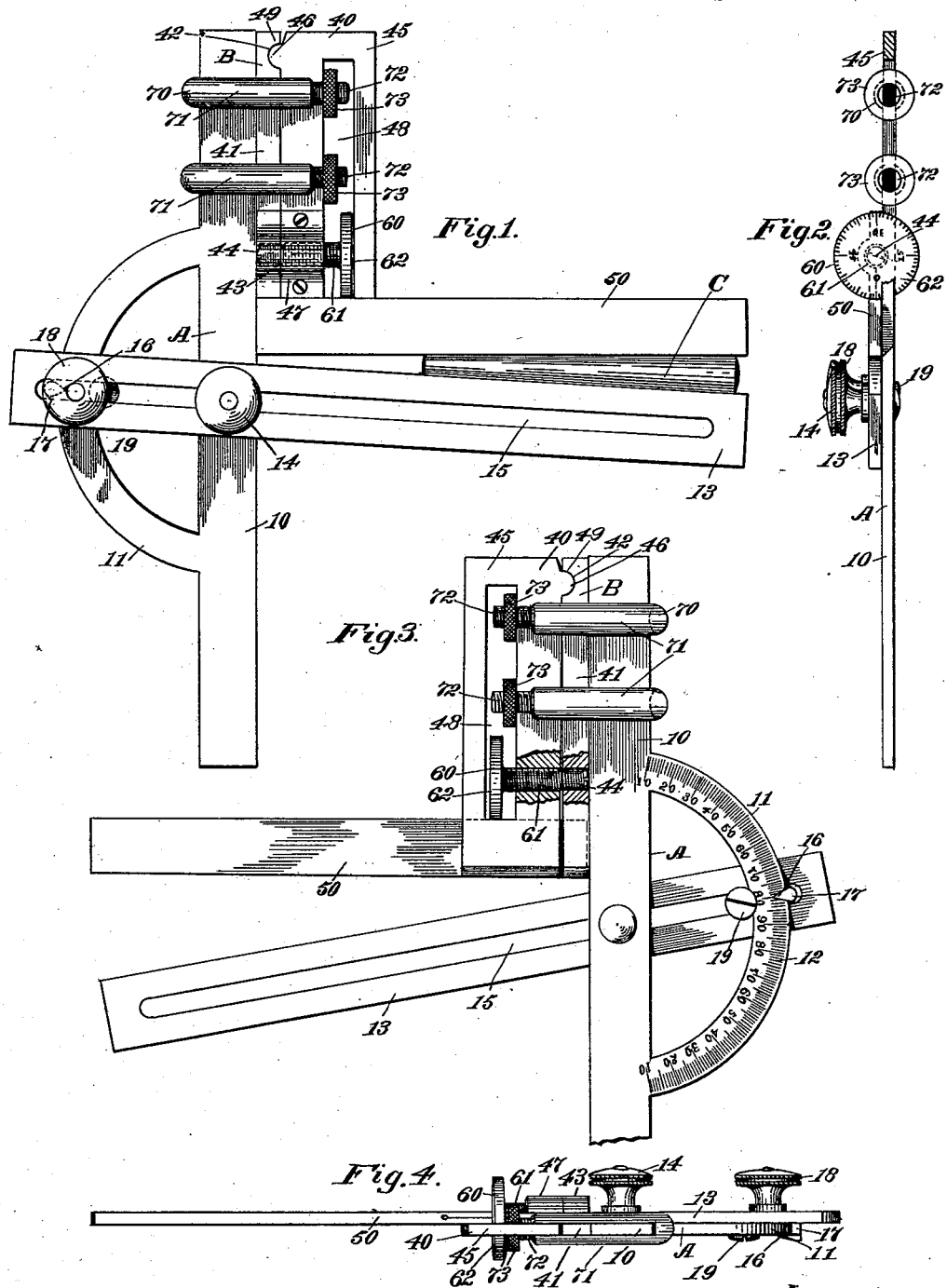
Witnesses:
R. W. Pittman
Fred. J. Dole
Inventor
W. J. Belcher
By his Attorney
F. N. Richards

UNITED STATES PATENT OFFICE.

WARREN J. BELCHER, OF HARTFORD, CONNECTICUT.

BEVEL-PROTRACTOR.

SPECIFICATION forming part of Letters Patent No. 568,597, dated September 29, 1896.

Application filed December 14, 1895. Serial No. 572,201. (No model.)

*To all whom it may concern:*

Be it known that I, WARREN J. BELCHER, a citizen of the United States, residing at Hartford, in the county of Hartford and State of Connecticut, have invented certain new and useful Improvements in Bevel-Protractors, of which the following is a specification.

This invention relates to that class of instruments known as "protractors," and more particularly designated as "bevel-protractors;" and the object of the invention is to provide a duplex or multiblade protractor, comprising a principal or primary protractor, for obtaining the principal or approximate angle, by indicating, for instance, the degrees thereof, and a supplemental or secondary protractor, operating, in connection with said primary protractor, for obtaining the finer divisions thereof, by indicating, for instance, the minutes and seconds of a degree.

A further object of the invention is to provide a measuring instrument of this class, comprising a primary or principal protractor having a secondary or supplemental protractor removably and adjustably secured thereto, whereby, on the removal of said supplemental protractor, the primary protractor can be used in the ordinary way for obtaining the principal or approximate angle independently of the supplemental protractor, and whereby, on the adjustment of the supplemental protractor in position relatively to the primary protractor, the measuring instrument can be used for marking both the principal or approximate angle and the fractions or finer divisions thereof, or one used independently of the adjustment of the other, if desired.

A further object of the invention is to provide a supplemental protractor which can be quickly and easily applied to protractors in ordinary use.

In the drawings accompanying and forming part of this specification, Figure 1 is a view of my improved measuring instrument, showing only the primary protractor adjusted to measure a tapering pin, as C. Fig. 2 is an edge view thereof, looking from the right to the left in Fig. 1, and having a part thereof broken away. Fig. 3 is a view of the opposite side of my measuring instrument from that shown in Fig. 1, and partly in section, and shows the primary protractor adjusted to an angle of ten degrees and the secondary protractor adjusted to a fraction of a degree; and Fig. 4 is a top edge view of Fig. 3.

Similar characters of reference designate like parts in all the figures of the drawings.

In measuring instruments of the bevel-protractor class heretofore in use, when it has been found necessary to adjust the blade for a fraction of a degree, which is often the case, such adjustment has usually been made by guesswork, whereby it is obvious that inaccurate results are frequently obtained. In order, therefore, to secure an instrument of this class in which the adjustment thereof will be absolutely accurate, even to the smallest fraction of a degree, I have provided an improved bevel-protractor, which, in the preferred form thereof herein shown and described, consists of a primary or principal protractor, which may be of any suitable or usual construction or form, adapted to measure the principal or approximate angle—such as the degrees of a circle—and which forms no inventive part of my invention, except so far as the same is used in connection with the supplemental or secondary protractor, and a supplemental or secondary protractor secured thereto and adapted to measure the finer divisions—such as the minutes or seconds of a degree. In the construction shown this secondary or supplemental protractor is adjustably and removably secured to the primary or principal protractor, whereby the same can be adjusted relatively thereto to permit articles of varying thicknesses to be measured, and whereby on the removal of the secondary protractor the primary protractor may be used in the ordinary way, and whereby, also, each may be used independently of the adjustment of the other.

The primary protractor (designated in a general way by A) may, as hereinbefore stated, be of any suitable or desired construction adapted for the purpose; but in the preferred form thereof herein shown and described and best adapted for the application of my improvement thereto (although it will be understood that other forms and constructions thereof may be used, if desired) it consists of a head or stock 10, having the usual graduated sector or protractor 11 secured thereto, and which is herein shown having the usual degree graduations 12 thereon. Pivotally secured to the head or stock 10 at the sector center by means of a fastening device, such as a thumb-screw 14, is a longitudinally-slotted blade 13. Secured for movement within the slot 15 of the blade 13, and for movement on the sector 11, is a suitable indicating device embodying a pointer and which, in the form shown, comprises a sliding member 17, having a threaded spindle extending through said slot 15, and onto which a thumb-nut 18 turns for clamping said pointer in position. The sliding member carries a pointer 16, bent over the marked face of the sector 11, and an adjusting-screw 19, the head of which engages the sector, whereby, by means of said pointer 16 and screw 19, said sliding member is firmly held for movement relatively to the sector.

The supplemental or secondary protractor (designated in a general way by B) in the preferred form thereof herein shown and described is adjustably and removably mounted on the head or stock 10 of the principal protractor A, and is adapted to be adjusted to and from the blade 13 of said protractor, as may be required in any particular instance for measuring angular pieces of varying thicknesses. This supplemental protractor, in one form thereof shown, comprises, in a general way, a suitable head, (designated in a general way by 40,) a blade, (designated in a general way by 50,) and secured to the head in any suitable way, and forming, in connection with said head, a "square," protraction means (designated in a general way by 60) for adjusting said blade to bring the same into angular relation to the primary blade 13 of the protractor A, and suitable means (designated in a general way by 70) for adjustably securing said head on the stock 10 of the primary protractor. In the form shown the head 40 preferably comprises a suitable member or base 41, having a curved recess 42 at one end thereof forming one member of a joint or circular hinge, and having adjacent to its other end a suitable threaded socketed projection 43, adapted to receive an adjustable screw 44, adapted to take up wear of the protraction means in a manner hereinafter set forth. The other member of this head comprises, in the preferred form thereof, a suitable slotted bar or member 45, having, adjacent to one end, a circular projection 46, adapted to engage in the recess 42 of the base member 41, and thereby forming a joint or hinge 49, said slotted member having, adjacent to its other end, a threaded socketed projection 47 for receiving the protraction means, said threaded socket being in alinement with the socket of the projection 43 of the base. The blade 50, in the form herein shown, is secured to the slotted member 45 at the opposite end from the hinge thereof and is adjustable therewith, and is in parallelism with the blade of the primary protractor when said blade is in its normal inoperative position, and, in the construction shown, it extends slightly below the slotted member, in order to engage the base member of the head, and thereby prevent wabbling of the same in its adjustment. The means 70, for securing and adjusting this supplemental protractor in position onto the head or stock 10 of the primary protractor, consists, in the preferred form thereof herein shown, of a suitable fastening device (shown in the nature of a pair of slotted U-shaped bolts or clamps 71) having exteriorly-threaded ends 72, adapted to receive adjusting-nuts 73. These U-shaped bolts or clamps connect the head 45 of the supplemental protractor with the head or stock 10 of the primary protractor, the adjusting-nuts thereof engaging the threaded ends of the clamps within the slot of said head 45.

The protraction means 60, for effecting the regulation of the supplemental protractor-blade 50, to adjust the same in angular relation relatively to the main protractor-blade, comprises, in the preferred form, an adjusting-screw 61, meshing with the threads of the socketed projection 47 of the adjustable member of the head, and having its lower end engaging the adjustable screw 44. This adjusting-screw is shown provided with a graduated dial 62, secured to said screw and working within the slot 48 of the adjustable member 45, and which dial, in practice, will usually be divided into sixty divisions or subdivisions of sixty. The distance between the axis of the joint or hinge 49 of the supplemental head and the axis of the adjusting-screw or protraction means 60 represents the radius of a circle, on the periphery of which is located the axis of said adjusting-screw 60. The pitch of this screw and the graduation of the dial will correspond to some regular division of said circle, so that by turning the adjusting-screw through a given arc or division, as indicated on the dial thereof, the blade will be adjusted to indicate some predetermined angle. For instance, if said radius be two inches, this will give a peripheral length of 12.5663, and if the pitch of the adjusting-screw be made one three-hundred-and-sixtieth part of said peripheral length one complete turn of said screw will therefore represent one degree, so that if the dial of said adjusting-screw is divided into sixty parts each division will represent one minute of a degree. In a corresponding manner the pitch of the screw and the division of the dial may be made to correspond with the distance between the axis of the screw and the hinge axis of the supplemental protractor, so as to indicate any required fraction of a degree or minute thereof.

It will be understood that instead of clamping the supplemental protractor to the primary protractor by means of U-shaped clamps extending around both members forming said head the base member 41 thereof could alone be adjustably clamped to the primary protractor-head 10 in any suitable manner and the joint or hinge be formed in any desired manner other than that shown, whereby the slotted member of the supplemental head would be adjustable relatively to the base member thereof on the actuation of the adjusting-screw 60 in a manner that will be obvious without a more explicit description. It will also be obvious that the adjustable member 45 need not necessarily be slotted. It will also be understood that the supplemental head need not be composed of two members, but may consist of one member adjustably and removably secured to the head of the primary protractor in any suitable way, or even similar to the manner herein described, for securing the adjustable members of the supplemental head together. It will also be understood that the graduation of the dial 62 could be placed on the periphery of said dial, if desired, rather than on the face thereof.

When the point or end of the adjusting-screw 60 becomes slightly worn by constant actuation, such wear can be taken up by means of the adjustable screw 44 in a manner that will be clearly understood.

In the use of my improved measuring instrument, when it is desired to adjust the device to an angle of, say, ten degrees and a fraction thereof, the primary blade 13 of the primary protractor A is adjusted so that its pointer will be at "80" (see Fig. 3) and clamped in position by its thumb-nut 18. The supplemental protractor B is then adjusted by means of the clamping-bolts 71 to any desired position on the head 10 of the primary protractor A in proportion to the size of the article or articles to be measured. The dial 62 of the adjusting-screw 60 is then turned from its normal inoperative position, which is represented by "0," which in such normal inoperative position is at the point marked "0" on the edge of the blade 50, (see Fig. 4,) to any desired point or fraction of the degree marked on said dial, whereby said supplemental blade 50 is moved to correspond with the movement of said dial, which, for instance, if said dial is moved to indicate forty-five minutes of a degree said blade would be moved correspondingly, so that the device would indicate an angle of ten degrees and forty-five minutes.

When it is desired to use the primary protractor without the supplemental protractor, it is simply necessary to loosen the clamps and remove the same from the head 10 of said primary protractor.

Having described my invention, I claim—

1. A measuring instrument comprising a primary protractor adapted to indicate the degrees of an angle, and a supplemental protractor, one of said protractors being adjustable relatively to the other to measure various sizes of articles; and actuating means for said supplemental protractor, comprising an adjusting device and graduated means for operating said device, said adjusting device having movements corresponding with the movements of said graduated operating means, whereby said supplemental protractor is adjustable to indicate the fractions of a degree.

2. A measuring instrument comprising a primary protractor adapted to indicate the degrees of an angle; a supplemental protractor secured thereto; and means for adjusting said supplemental protractor relatively to said primary protractor, to indicate the fractions of a degree, and comprising an adjusting-screw and graduated actuating means for operating said screw, the pitch of said screw corresponding with the graduation of said operating means.

3. A measuring instrument comprising a primary protractor having a blade adjustable to indicate the degrees of an angle; and a detachable, supplemental protractor secured to said primary protractor, and comprising a blade extending side by side with the blade of the primary protractor, and a head carrying said blade and extending substantially at right angles to said blade; and actuating means adapted to adjust said supplemental protractor-blade, to indicate the fractions of a degree.

4. A measuring instrument consisting of a primary protractor adapted to indicate the degrees of an angle; and a supplemental protractor comprising a square having means to secure it in position on the primary protractor, and also having means whereby it can be adjusted relatively to said primary protractor to indicate the fractions of a degree.

5. In a measuring instrument, the combination of a primary protractor; a supplemental protractor consisting of a head comprising a base member, and an adjustable member hinged thereto; means for securing said head to the primary protractor; an adjusting-screw for said adjustable member, and having a graduated dial, the pitch of said screw corresponding with the graduation of said dial; and a blade secured to said adjustable member, and adapted to be moved to correspond with the movement of said dial.

6. In a measuring instrument, the combination of a primary protractor adapted to indicate the degrees of an angle, and consisting of a head or stock having a graduated sector secured thereto; a slotted blade pivotally secured to said head, and carrying an indicating device adapted to move in the arc of a circle on said sector; a clamping device for clamping said indicator in position; and a clamping device for clamping said slotted blade in position; and a supplemental protractor, consisting of a head comprising a base member and a member adjustable relatively thereto; a blade secured to said adjustable member, and forming, in connection with said head, a square; clamping means for adjustably and removably clamping said head to the head of the primary protractor; an adjusting-screw carried by the adjustable member of the supplemental protractor, and operative to adjust said adjustable member and blade relatively to the base member, said adjusting-screw having a graduated dial, and also having its pitch corresponding with the graduation of said dial, whereby on the adjustment of said dial the blade will be adjusted to indicate the fraction of a degree; and means, carried by said base member, for taking up the wear of said adjusting-screw.

7. A measuring instrument consisting of a primary protractor, a supplemental protractor adjustable relatively thereto, and consisting of a head comprising two members, one of which is adjustable relatively to the other; a blade secured to said adjustable member; and means for actuating said adjustable member and blade, to indicate the fractions of a degree.

8. In a measuring instrument, the combination of a primary protractor; a supplemental protractor having a head adjustably and removably secured to said primary protractor; a blade immovably secured to said head; and means for actuating said head and blade, to indicate the fractions of a degree.

9. A supplemental protractor for a measuring instrument, consisting of a head comprising a base member and a member adjustable relatively thereto; an adjusting-screw for said adjustable member having a graduated dial, the pitch of said screw corresponding with the graduation of said dial; and a blade secured to said adjustable member, and adapted to be moved to correspond with the movement of said dial.

10. A supplemental protractor for a measuring instrument, consisting of a head comprising a base member having a threaded socket, a slotted adjustable member hinged thereto, and also having a threaded socket in alinement with the socket of the base member; a blade secured to said adjustable member, and forming with said head a square; protraction means consisting of an adjusting-screw engaging the threads of the socket of the adjustable member, and having a graduated dial secured thereto, and working in the slot of said member; and a screw adjustable in the threaded socket of the base member.

11. A supplemental protractor for a measuring instrument, consisting of a head comprising a base member, and an adjustable member having a threaded socket; a blade secured to said adjustable member; protraction means consisting of an adjusting-screw working within the threaded socket of said adjustable member; and a graduated dial secured to said screw, and operative to move said adjustable member and blade, to indicate the fractions of a degree.

12. A supplemental protractor for a measuring instrument, consisting of a head comprising a base member having a curved recess adjacent to one end thereof, and a threaded socket adjacent to the other end thereof; an adjustable screw engaging the threads of said socket; and an adjustable member having a curved projection forming, with the curved recess of the base member, a joint or hinge, and also having a threaded socket in alinement with the socket of the base member; a blade secured to said adjustable member, and forming with said head a square; and protraction means consisting of an adjusting-screw working in the threaded socket of the adjustable member, and having a graduated dial, said adjusting-screw having its pitch corresponding with the graduation of said dial, whereby on the adjustment of said dial the blade will be adjusted, to indicate the fraction of a degree.

13. In a measuring instrument, the combination of a primary protractor having a head; a supplemental protractor consisting of a head comprising a base member and an adjustable member; a U-shaped clamp having threaded ends adapted to receive an adjusting-nut for adjustably securing said supplemental protractor-head to the primary protractor-head; a blade secured to said adjustable member; and means for actuating said adjustable member and blade, to indicate the fractions of a degree.

14. A supplemental protractor for a measuring instrument, comprising a square having means adapted to secure it in position on a primary protractor, and also having actuating means comprising an adjustable screw having a graduated dial, the pitch of said screw corresponding with the graduation of said dial, whereby it can be adjusted relatively to the primary protractor, to indicate the fractions of a degree.

15. A supplemental protractor adapted for attachment to a primary protractor, and comprising a head or stock; means secured thereto and adapted to indicate the fractions of a degree; actuating means for adjusting said supplemental protractor relatively to said primary protractor; and means for taking up the wear of said actuating means.

16. A supplemental protractor consisting of a head or stock comprising two members, one of which is adjustable relatively to the other; and a blade secured to the adjustable member, and having a part thereof in position to engage the non-adjustable member and be guided thereby.

WARREN J. BELCHER.

Witnesses:
FRED. J. DOLE,
HENRY BISSELL.